UNITED STATES PATENT OFFICE.

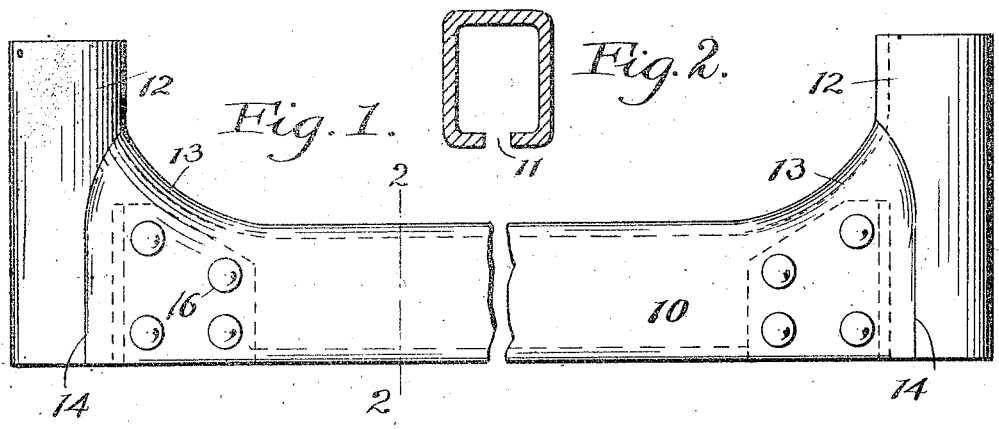
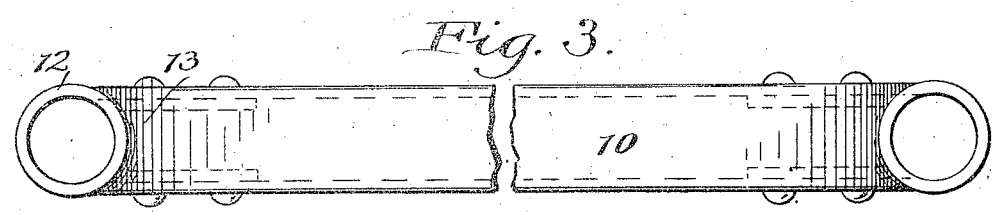
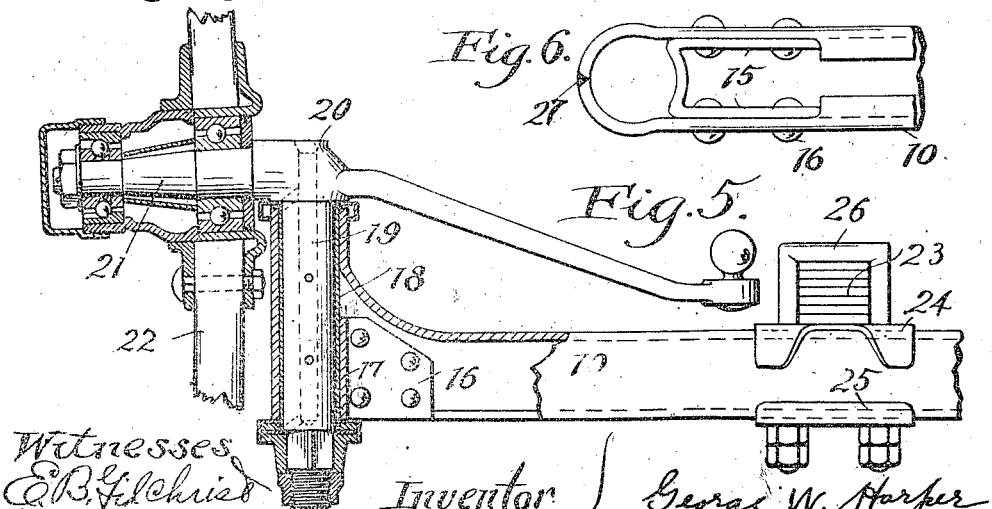
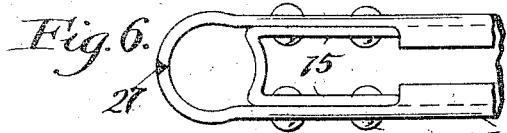

GEORGE W. HARPER, OF CLEVELAND, OHIO.

FRONT AXLE FOR VEHICLES.

1,288,574.

Specification of Letters Patent.

Patented Dec. 24, 1918.

Application filed March 4, 1915. Serial No. 11,942.

*To all whom it may concern:*

Be it known that I, GEORGE W. HARPER, a citizen of the United States, residing at Cleveland, in the county of Cuyahoga and State of Ohio, have invented a certain new and useful Improvement in Front Axles for Vehicles, of which the following is a full, clear, and exact description.

This invention relates to front axles for motor vehicles, and has for its object to provide an axle which is strong and durable, light in weight, and is far less expensive to produce than the present forged steel front axles.

The above and other objects are accomplished by a sheet metal axle stamped from a blank of sheet metal and provided with integral cross piece and sockets for the knuckle spindles.

With this construction I am enabled to save a great deal of machining which is necessary with the forged axles, and require a great deal less metal, and at the same time by properly shaping the axle proper or cross piece, my improved axle is able to resist bending and torsional and other stresses as effectively as the forged steel axles.

My invention may be further briefly summarized as consisting in certain novel details of construction and combinations of parts and arrangement of parts which will be described in the specification and set forth in the appended claims.

In the accompanying sheet of drawings, Figure 1 is a side view of a front axle embodying my invention, the middle portion of the axle being broken away; Fig. 2 is a sectional view substantially along the line 2—2 of Fig. 1; Fig. 3 is a top plan view of the axle; Fig. 4 is a bottom view of the same; Fig. 5 is a view partly in side elevation and partly in section showing in assembled relation portions of the wheel, knuckle, axle and vehicle spring, and Fig. 6 is a bottom view of one end of an axle showing a slight modification.

The axle, as aforestated, is formed from sheet metal, and the principal portion of the axle including the cross piece or axle proper and the cylindrical shaped sockets or bearing members for the knuckle spindles are formed from one integral and continuous piece, and to form which I employ a plurality of different dies which in successive operations gradually convert a flat blank into the shape to be subsequently described. The axle proper, or cross piece, which is shown at 10, is hollow, and is preferably rectangular in cross section, as shown in Fig. 2. The section here shown is substantially that of an inverted U with the edge portions 11 of the strip turned in toward each other, forming a narrow slot along the lower side of the axle. The cross sectional shape of this part of the axle can be varied somewhat from the shape shown, especially as to the width of the slot between the inturned edges.

At the ends of the axle proper, or cross piece 10, there are formed integral sockets or bearing members 12 for the knuckle spindles for the front wheels of the vehicle, these sockets or bearing members being on the whole cylindrical in shape. In this case these socket portions 12 extend upwardly from the lower edge of the axle, the bottom of the socket portions 12 being substantially flush with the lower surface of the cross piece 10. This may be also varied somewhat by having the socket members extend both above and below the axle or cross piece. The rectangular shaped cross piece merges gradually into the cylindrical socket portions 12, the upper part of the connecting portion being concave or gradually increasing in vertical depth, as shown at 13. The side walls of the merging portion continue in parallelism substantially to the point where they join the cylindrical socket or bearing members 12, these parts being merged along the curved line indicated at 14. This forms a construction wherein the top portion of each socket or bearing member 12 is cylindrical, and wherein the outer lower portion constitutes a part of a cylinder, the lower part of the cylindrical socket or recess opposite the cross piece 10 being open, inasmuch as it merges into the rectangular shaped opening extending through the cross piece.

To properly support the knuckle spindles at the inner sides, I provide auxiliary bearing members 15 which are substantially U-shaped as shown in the drawings, these members having parallel ears or inwardly extending portions which are secured by rivets 16 to the flat parallel walls of the end portions of the cross piece, or in other words, the portions of the axle member in which the rectangular shape is merged into the cylindrical shape. In addition, these members 15 each have a cylindrical shaped bearing portion 17, the inner surface of which constitutes a continuation of the inner cylindrical surface of the socket member 12. This forms a substantially complete cylindrical bearing from the top of the member 12 to the bottom thereof.

The break between the upper cylindrical portion and the cylindrical shaped bearing provided by the member 15 is of no consequence for the reason that there is provided on the interior of the socket a sleeve 18, which constitutes the actual or direct bearing for the knuckle spindle 19, as shown in Fig. 5. In this figure the knuckle which is designated as a whole by the reference character 20 is provided with the usual outwardly projecting wheel spindle 21 on which is rotatably supported the wheel 22. In this figure last referred to I have shown the manner in which the front spring 23 may be clamped by upper and lower clamping members 24 and 25 and U-shaped bolt 26 to the rectangular shaped cross piece or axle proper. It may be mentioned at this point that the holes for the bolts 26, as well as all other holes, such as are required for the rivets 16, will be punched during the first blanking operation.

The outer portion of the cylindrical bearing or socket member 12 may be continuous or these portions may be formed from wings or extensions of the metal blank and united on the center line by welding, as indicated at 27 in Fig. 6. Although the cylindrical socket members 12 are formed from extensions which are united as at 27, it will be understood that the entire axle with the exception of the auxiliary bearing members 15 are still formed from one continuous or integral piece of sheet metal.

In forming this axle, there is practically no machining required whatever, the major portion of the axle including the cross piece and the socket members 12 being formed solely by dies or by a stamping or pressing process. Additionally, there is effected a considerable saving of metal, the construction is light in weight, and because of the shape of the cross piece or axle proper, and because the parts are of one integral construction, the axle is strong and able to withstand successfully all the stresses to which the front axle is subjected.

I do not desire to be confined to the exact details or configuration herein shown, but aim in my claims to cover all modifications which do not involve a departure from the spirit and scope of my invention.

Having thus described my invention, what I claim is:—

1. A front axle member for vehicles formed in one piece from sheet metal and comprising a hollow cross-piece or axle proper and integral hollow bearing members at substantially right angles to the cross-piece, and each being in part cylindrical in shape and gradually merging into the cross-piece, each bearing member being formed with a space or passageway for a spindle continuous with the hollow space or passageway in the cross-piece.

2. A front axle for vehicles comprising a one piece axle member formed from sheet metal and composed of a hollow cross-piece or axle proper and integral hollow bearing members at substantially right angles to the cross-piece, a portion of the wall of each of said bearing members being substantially cylindrical in shape, and a portion being merged into the cross-piece, and auxiliary bearing pieces adjacent the bearing members opposite the points where the passageway through the axle proper merges with the spaces or passageways extending through the hollow bearing members.

3. A front axle comprising an axle member formed from sheet metal and composed of a hollow cross piece or axle proper and integral hollow bearing members at right angles to the cross piece, a portion of the wall of each of said bearing members being cylindrical in shape and a portion being merged into the cross piece, and auxiliary bearing pieces secured between the walls of the cross piece adjacent the bearing members and adapted to support the spindles opposite the opening in the cross piece.

In testimony whereof, I hereunto affix my signature in the presence of two witnesses.

GEORGE W. HARPER.

Witnesses:
A. F. KWIS,
C. V. SCHURGER.